(12) United States Patent
Barber et al.

(10) Patent No.: US 8,770,513 B2
(45) Date of Patent: Jul. 8, 2014

(54) RESILIENT AIRCRAFT ENGINE MOUNTS AND AIRCRAFT ENGINE MOUNTING SYSTEMS INCLUDING THE SAME

(75) Inventors: Tim Daniel Barber, Litchfield Park, AZ (US); Timothy Hindle, Peoria, AZ (US); Steven Hadden, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 390 days.

(21) Appl. No.: 13/308,178

(22) Filed: Nov. 30, 2011

(65) Prior Publication Data

US 2013/0134257 A1    May 30, 2013

(51) Int. Cl.
*B64D 27/00* (2006.01)

(52) U.S. Cl.
USPC .................. 244/54; 248/557; 180/291

(58) Field of Classification Search
USPC ............ 244/54; 248/638, 640, 659, 554, 555, 248/556, 557; 180/291
See application file for complete search history.

(56) References Cited

U.S. PATENT DOCUMENTS

| | | | |
|---|---|---|---|
| 3,317,166 A * | 5/1967 | Hans-Joachim | 248/604 |
| 4,111,386 A | 9/1978 | Kenigsberg et al. | |
| 4,139,245 A | 2/1979 | McCloskey | |
| 4,214,738 A | 7/1980 | Casper | |
| 4,619,349 A * | 10/1986 | Braun | 188/380 |
| 4,929,113 A | 5/1990 | Sheu | |
| 5,101,533 A * | 4/1992 | Stenger et al. | 16/340 |
| 6,328,293 B1 | 12/2001 | Olsen | |
| 6,397,988 B1 * | 6/2002 | Ptak | 188/380 |
| 6,715,746 B2 * | 4/2004 | Bachmeyer et al. | 267/294 |
| 7,249,756 B1 | 7/2007 | Wilke et al. | |
| 7,290,644 B2 * | 11/2007 | Miyake | 188/379 |
| 7,461,815 B2 | 12/2008 | Almeras et al. | |
| 7,900,873 B2 | 3/2011 | Kulesha et al. | |
| 7,967,353 B2 | 6/2011 | Robins | |
| 2006/0214339 A1 * | 9/2006 | Miyake | 267/140.12 |
| 2008/0136071 A1 | 6/2008 | Weisbeck et al. | |
| 2010/0207007 A1 | 8/2010 | Cottrell et al. | |
| 2012/0018575 A1 * | 1/2012 | Whiteford et al. | 244/54 |

FOREIGN PATENT DOCUMENTS

| | | | | |
|---|---|---|---|---|
| DE | 3731479 A1 * | 4/1989 | | B60K 5/12 |
| DE | 19650801 A1 * | 6/1997 | | F16F 13/00 |
| EP | 0303405 A2 | 2/1989 | | |
| EP | 1650626 A1 | 4/2006 | | |
| GB | 2490781 A | 11/2012 | | |
| WO | 9925990 A1 | 5/1999 | | |

OTHER PUBLICATIONS

GB Examination and Search Report for Application No. GB1221398.9 dated Mar. 25, 2013.

* cited by examiner

*Primary Examiner* — Benjamin P Lee
(74) *Attorney, Agent, or Firm* — Ingrassia Fisher & Lorenz, P.C.

(57) ABSTRACT

Resilient aircraft engine mounts and mounting systems including the same are provided. A resilient aircraft engine mount comprises a base and a pair of opposed spiral springs in parallel forming a clevis with the base. A first spiral spring of the pair of opposed spiral springs has a first center opening extending therethrough. A second spiral spring of the pair of opposed spiral springs has a second center opening extending therethrough that is concentric with the first center opening for accepting a clevis pin. First and second spiral springs are each comprised of a rectangular cross section beam. The resilient aircraft engine mount is tunable in three translational axes to support three degrees of freedom vibration isolation. Two or more resilient aircraft engine mounts provide six degrees of freedom vibration isolation. Resilient aircraft engine mounts attach the aircraft engine to a pylon structure and help isolate vibratory forces.

20 Claims, 8 Drawing Sheets

RESILIENT AIRCRAFT ENGINE MOUNTS AND AIRCRAFT ENGINE MOUNTING SYSTEMS INCLUDING THE SAME

TECHNICAL FIELD

The present invention generally relates to aircraft engine mounting systems that provide vibration isolation, and more particularly relates to resilient aircraft engine mounts and aircraft engine mounting systems including the same.

BACKGROUND

Aircraft engines are typically mounted laterally on a fuselage of an aircraft via a pylon structure. Each pylon structure includes generally C-shaped yokes, and generally radially extending spars. Conventional engine mounting systems connect the yoke of the pylon structure and the aircraft engine by means of rigid clevis mounts 10 (FIG. 1). Conventional rigid clevis mounts include two symmetrical flanges 12.

Rotational imbalance of the aircraft engine causes vibration from the engine to be transmitted into the yoke of the pylon structure, through the intermediate spar thereof, and into the aircraft fuselage resulting in noise and vibration in the aircraft cabin. Such vibrations are referred to as "dynamic forces." In the case of dynamic forces (vibration), "compliance" is the ratio of the excited vibrational amplitude (angular or linear displacement) to the magnitude of the force. As used herein, "stiffness" refers to how far an aircraft fuselage moves from the vibration force of the aircraft engine and is measured in pound force/inches (lbf/in). The higher the compliance (i.e., the lower the stiffness), the better the high frequency vibration isolation. Significant dynamic forces from all six degrees of freedom of the aircraft engine often exist; therefore, complete six degree-of-freedom vibration load isolation is often desired.

Unfortunately, conventional rigid clevis mounts provide little or no vibration isolation due to their high stiffness (i.e., low compliance). While conventional rigid clevis mounts provide tunable stiffness to make more compliant in two axes (locally) by adjusting the length, width and/or height of the flanges thereof, and in concert with multiple rigid clevis mounts and/or vibration isolation struts, help support the engine in all six degrees of freedom, they are only tunable in a relatively small range before becoming susceptible to stress failures (if the flanges are too thin) or becoming too heavy for optimum aircraft efficiency (if the flanges are too thick).

Accordingly, it is desirable to provide resilient aircraft engine mounts and aircraft engine mounting systems including the same. In addition, it is desirable to provide resilient aircraft engine mounts that provide compliance without substantial cross-axis reaction forces, that are compact and lightweight, easily stiffness tunable to make more compliant over a greater range than conventional clevis mounts, in three degrees of freedom (per resilient aircraft engine mount) (translational degree of freedom) to support all six degrees of freedom, and that provide an easy replacement or conversion from rigid clevis mounts in engine mounting systems.

BRIEF SUMMARY

Resilient aircraft engine mounts are provided. In accordance with exemplary embodiments, a resilient aircraft engine mount comprises a base and a pair of opposed spiral springs in parallel forming a clevis with the base. A first spiral spring of the pair of opposed spiral springs has a first center opening extending therethrough. A second spiral spring of the pair of opposed spiral springs has a second center opening extending therethrough that is concentric with the first center opening for accepting a clevis pin.

Aircraft engine mounting systems are provided. In accordance with an exemplary embodiment, the aircraft engine mounting system comprises a pair of resilient aircraft engine mounts and a pair of clevis pins. Each resilient aircraft engine mount of the pair of resilient aircraft engine mounts comprises a base for attaching to a mount location on an aircraft engine and a pair of opposed spiral springs in parallel forming a clevis with the base. A first spiral spring of the pair of opposed spiral springs has a first center opening extending therethrough and a second spiral spring of the pair of opposed spiral springs has a second center opening extending therethrough that is concentric with the first center opening for accepting a clevis pin. Each resilient aircraft engine mount is independently tunable in three translational axes.

Aircraft engine mounting systems for isolating aircraft engine-produced vibratory forces from a fuselage of an aircraft and for attaching an aircraft engine to a pylon structure comprising a yoke having a first mounting portion and a second mounting portion are provided. Each of the first and second mounting portions having a mount opening therethrough. A first resilient aircraft engine mount is attached to a first mount location of the aircraft engine and a second resilient aircraft engine mount is attached to a second mount location of the aircraft engine. Each of the first and second resilient aircraft engine mounts comprise a base for attaching to the respective mount location of the aircraft engine and a pair of opposed spiral springs in parallel forming a clevis. A first spiral spring of the pair of opposed spiral springs has a first opening extending therethrough. A second spiral spring of the pair of opposed spiral springs has a second opening extending therethrough that is concentric with the first opening for accepting a clevis pin. Each resilient aircraft engine mount is independently tunable in three translational axes. The first mounting portion of the yoke is disposed between the first and second spiral springs of the first resilient aircraft engine mount with a first clevis pin extending and secured through the first opening, the mount opening, and the second opening. The second mounting portion is disposed between the first and second spiral springs of the second resilient aircraft engine mount with a second clevis pin extending and secured through the first opening, the second opening, and the mount opening.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

Figure 1:
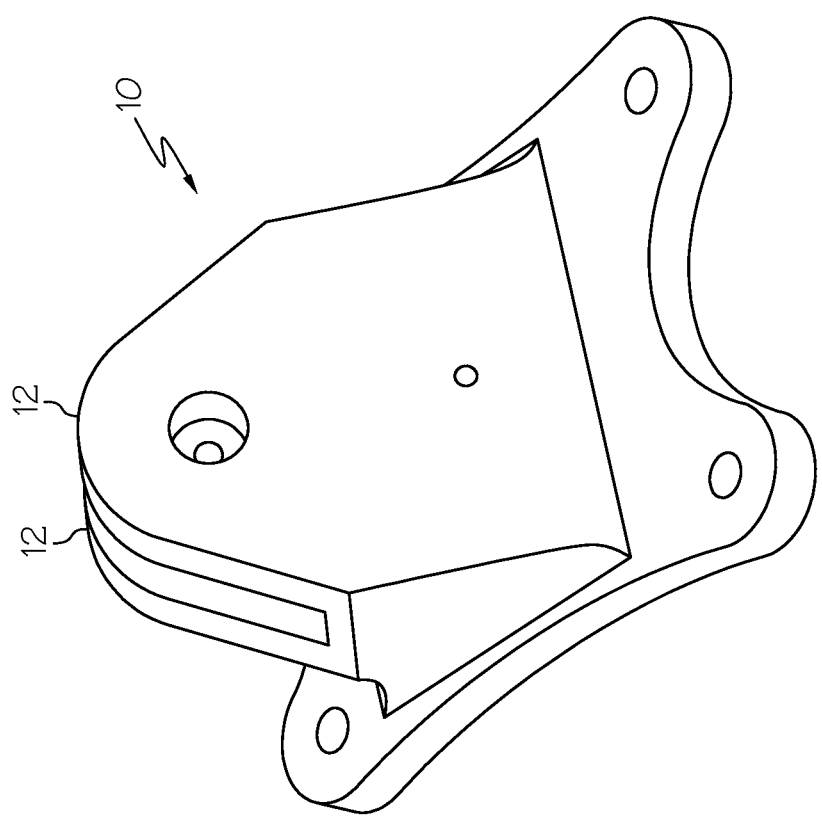
FIG. 1 is a perspective side view of a prior art rigid clevis mount.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various exemplary embodiments are directed to resilient aircraft engine mounts and aircraft engine mounting systems including the same. The resilient aircraft engine mounts both attach an aircraft engine to a pylon structure of an aircraft and provide compliance for vibration isolation. Each resilient aircraft engine mount has a tunable stiffness in three translational axes. The vibration isolation system comprising two or more resilient aircraft engine mounts provides six degree of freedom vibration load isolation. As noted above, "stiffness" refers to how far an aircraft fuselage moves from the vibration force of the aircraft engine and is measured in pound force/inches (lbf/in). Compared to conventional rigid clevis mounts, the resilient aircraft engine mounts are stiffness tunable over a larger tunable range while being relatively lightweight and compact. The resilient aircraft engine mounts also provide compliance without substantial cross-axis reaction forces, and provide an easy replacement or conversion from conventional rigid clevis mounts in aircraft engine mounting systems with minimum modification to surrounding structures. The resilient aircraft engine mounts help provide substantial isolation of the fuselage from high frequency dynamic forces in all load directions while simultaneously supporting the aircraft engine with limited, but predictable movement of the fuselage relative to the engine. The stiffness of the resilient aircraft engine mounts in the engine mounting system can be simply tuned to provide a six degree of freedom vibration isolation system with each degree of freedom tuned as desired (e.g., stiffer in the thrust axis to take the large thrust loads and softer in the axes that do not experience large quasi-static loads). Two or more resilient aircraft engine mounts substantially reduce the translational and rotational components of vibration transmitted to the fuselage from the at least one aircraft engine(s) at frequencies greater than the vibration isolation system resonant frequencies (defined by the engine mass/inertia and vibration isolation stiffness). The resilient aircraft engine mounts according to exemplary embodiments replace conventional rigid clevis mounts in aircraft engine mounting systems where reduced stiffness is needed to isolate the engine-produced vibratory forces from the fuselage.

Figure 2:
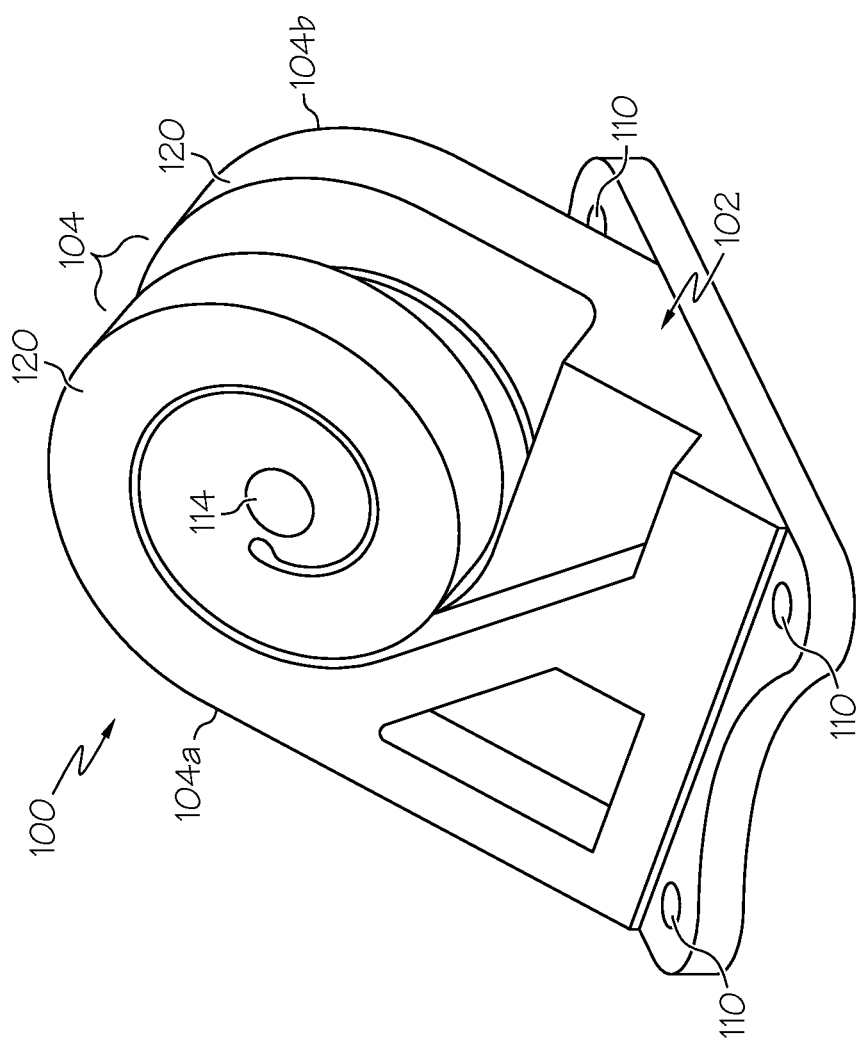
FIG. 2 is a perspective top view of a resilient aircraft engine mount comprising a pair of opposed spiral springs according to exemplary embodiments.
Figure 3:
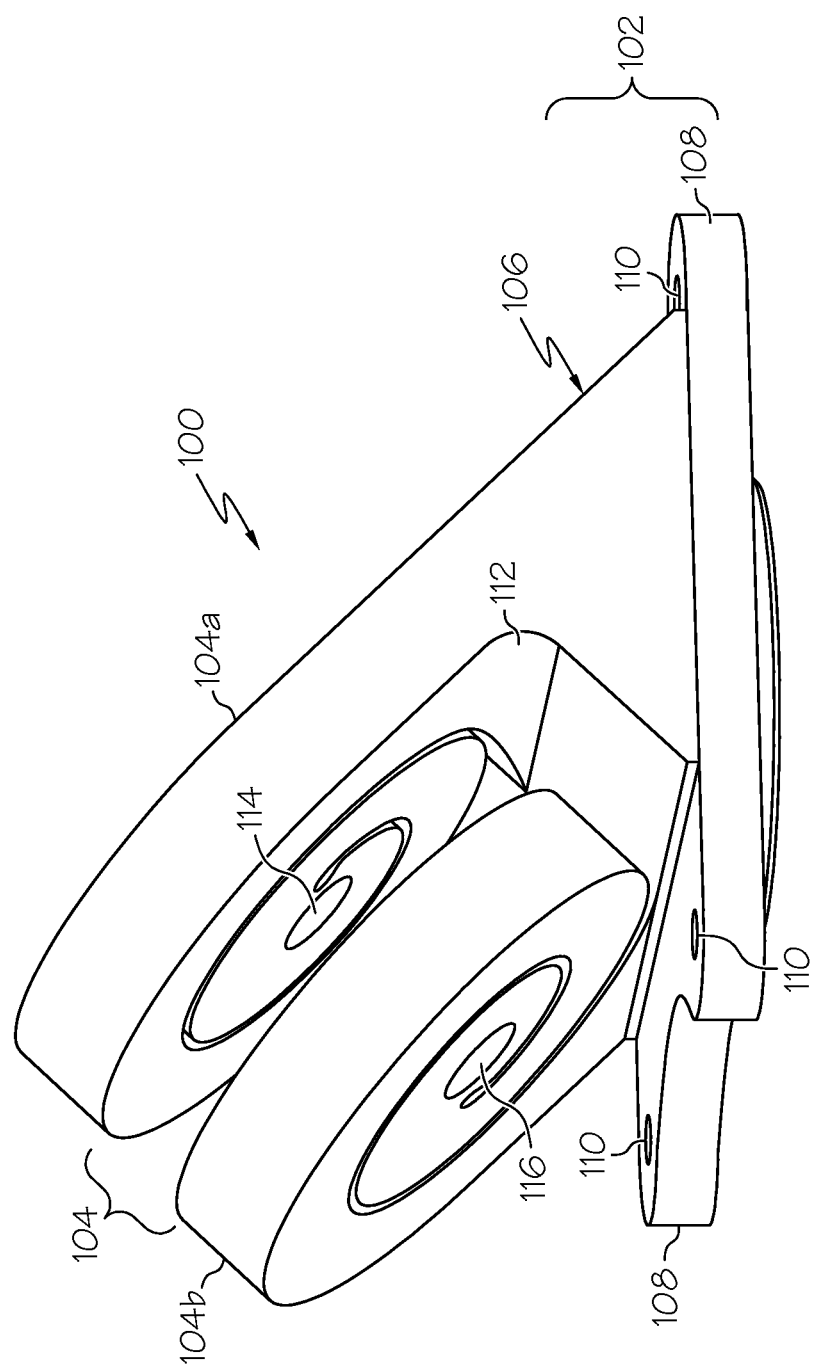
FIG. 3 is a perspective side view of the resilient aircraft engine mount of FIG. 2.

Referring to FIGS. 2 and 3, according to exemplary embodiments, a resilient aircraft engine mount 100 comprises a base 102 and a pair of opposed spiral springs 104 in parallel forming a clevis with the base. The base and the pair of opposed spiral springs are preferably integrally formed as a single structure, such as a single machined structure or a single cast structure. The resilient aircraft engine mount may be machined or cast from a single block of high strength material such as for example, titanium, in order to provide a positive stress margin for the applied load or displacement. Alternatively, the base and the pair of opposed spiral springs may be manufactured separately, and then assembled together. The base 102 of the resilient aircraft engine mount 100 comprises a wedge-shaped portion 106 and a mounting plate 108 including one or more apertures 110 formed therein for receiving attachment members 111 such as bolts or the like for mounting the resilient aircraft engine mount to a mount location on the aircraft engine structure (the attachment members 111, mount location, and aircraft engine structure are not shown in FIGS. 2 and 3) as hereinafter described. As best illustrated in FIG. 3, the wedge-shaped portion 106 tapers from the substantially flat mounting plate 108 to a first spiral spring 104a of the pair of opposed spiral springs 104. A second spiral spring 104b of the pair of opposed spiral springs 104 is disposed intermediate the first spiral spring 104a and the substantially flat mounting plate 108. An inside surface 112 of the wedge-shaped portion 106 between the pair of opposed spiral springs 104 completes the clevis. The pair of opposed spiral springs 104 are angled from the base at an angle from about 10° to about 90°. As illustrated in FIG. 2, and as known in the art, material may be removed from the wedge-shaped portion of the base to lower the weight of the resilient aircraft engine mount 100. In an embodiment, the mounting plate 108 may further include an extension 200 (FIG. 7) for attaching a second axial end portion of at least one damper 402, as hereinafter described.

Figure 5:
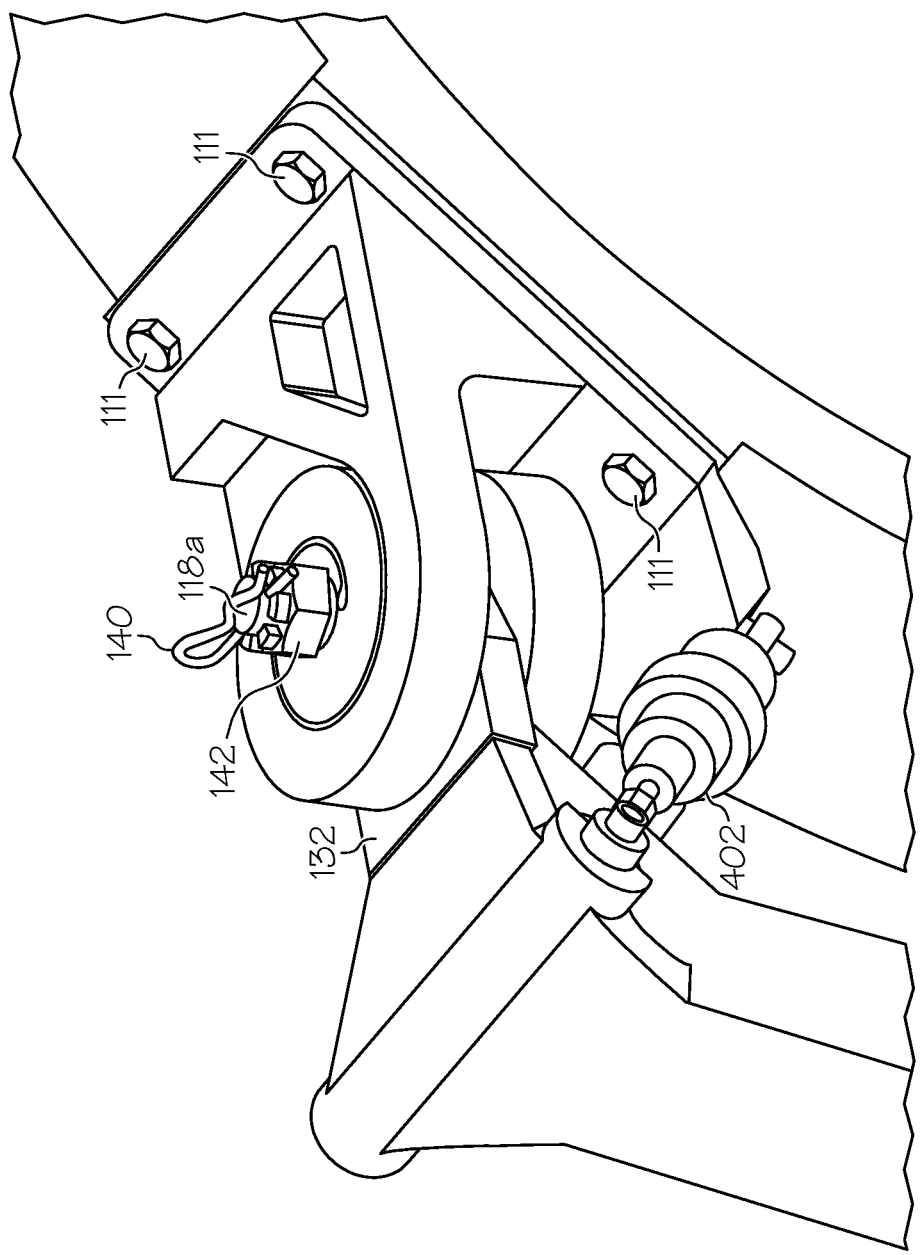
FIG. 5 is an enlarged perspective view of the first resilient aircraft engine mount of FIG. 4, with a first mounting portion of the generally C-shaped yoke disposed between the pair of opposed spiral springs thereof and a clevis pin of the pair of clevis pins extending through the first center opening, the mount opening, and the second center opening, and secured by a hitch pin and a locking nut.
Figure 6:
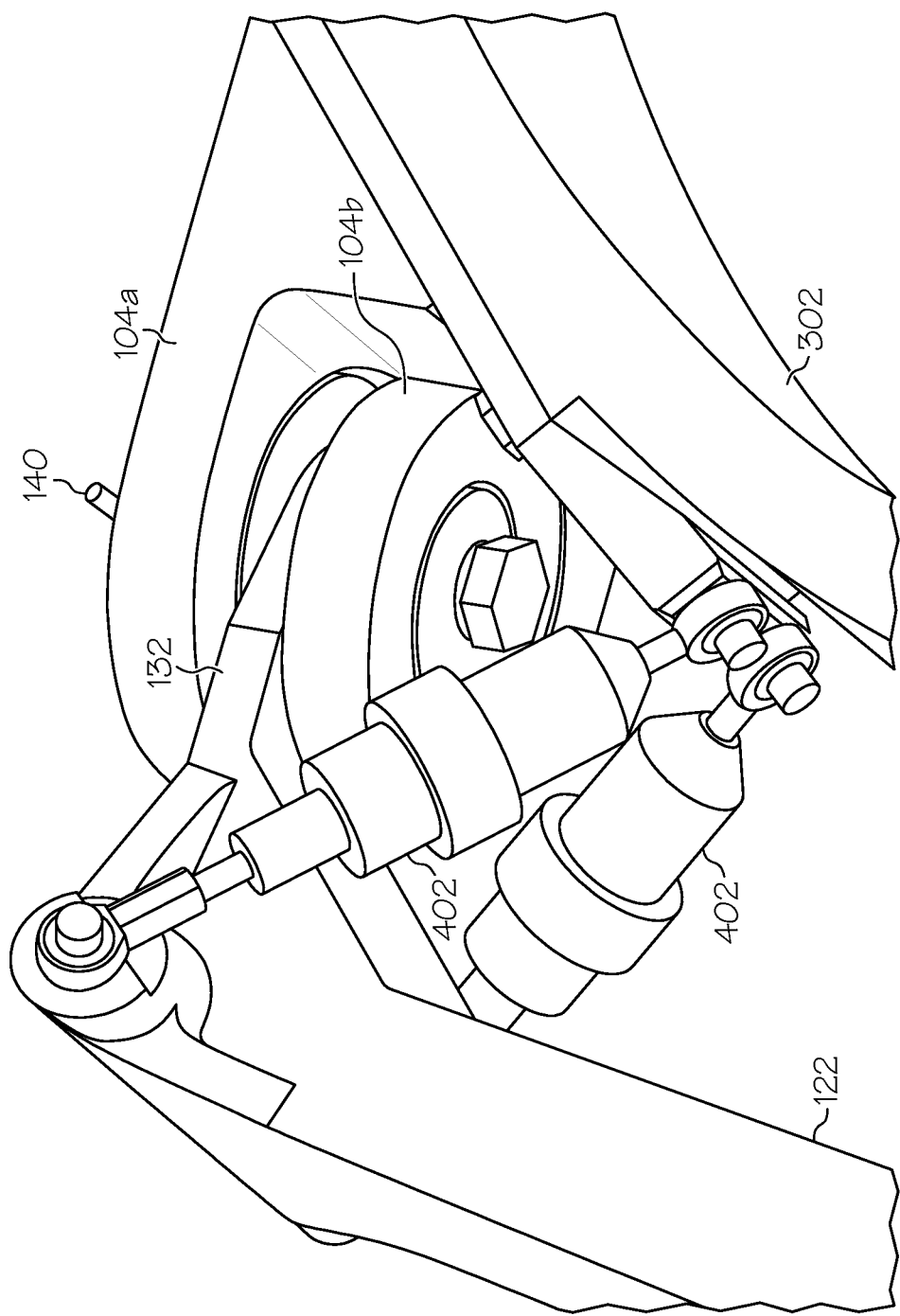
FIG. 6 is an enlarged perspective bottom view of the first resilient aircraft engine mount of FIG. 5, illustrating a pair of dampers releasably coupled between a base of the first resilient aircraft engine mount and the yoke.

Still referring to FIGS. 2 and 3, the first spiral spring 104a of the pair of opposed spiral springs 104 has a first center opening 114 extending therethrough. The second spiral spring 104b has a second center opening 116 extending therethrough that is concentric with the first center opening for accepting a clevis pin 118 (not shown in FIGS. 2 and 3; See, e.g., FIG. 5)) as hereinafter described. Unlike a single spiral spring that exhibits complex motion when loaded with a force (i.e., it moves in an axis other than where the force is applied), the pair of opposed spiral springs 104 does not exhibit complex motion, but rather it deflects in the axis load is applied (without significant motion in other axes). Each of the first and second spiral springs 104a and 104b of the pair of opposed spiral springs 104 comprises a beam 120 having a generally rectangular cross-section. Each beam has a first end and a second end. The beam 120 of the first spiral spring 104a is wound in the opposite direction from the beam 120 of the second spiral spring 104b thereby forming the pair of "opposed" spiral springs. Therefore, the pair of spiral springs are "opposing" in that the beams 120 thereof are wound in opposite directions. The second opposed spiral spring counteracts any off-axis motion by the first spiral spring 104a, thereby substantially eliminating undesirable off-axis forces and displacements. While the first and second spiral springs 104a and 104b are illustrated as being oppositely wound in a particular direction, it is to be understood that each of the first and second spiral springs may be wound in a different direction than illustrated, as long as the first and second spiral springs are "opposed." Each of the beams has a selected length, a selected height, and a selected width for permitting the tuning of the resilient aircraft engine mount 100 in three translational axes. The cross-section of each beam of each of the first and second spiral springs should be the same. The stiffness of the resilient aircraft engine mount 100 is tunable in the three translational axes by changing the cross section and length of the beams 120, i.e., the dimensions that make up each beam are variable in length, height, and width to provide stiffness turning in three orthogonal translational directions. The resilient aircraft engine mount has a selected axial stiffness that is different from the stiffness in the lateral directions. Thus, the resilient aircraft engine mount 100 permits a larger stiffness tunable range than a conventional rigid clevis mount, without risking stress failures or being too heavy for less than optimum aircraft operating efficiencies. By varying the dimensions of the beams of the spiral springs 104a and 104b (but each of the beams having the same dimensions) in the resilient aircraft engine mount 100, the resilient aircraft engine mount according to exemplary embodiments can thus be easily tuned to suppress vibration loads at low or high frequencies.

The first and second spiral springs 104a and 104b of the pair of opposed spiral springs 104 are arranged parallel to one another, as shown in FIGS. 2 through 8, so that the resilient aircraft engine mount 100 remains compact, thus allowing for close spacing in a aircraft engine mounting system 300 (FIG. 4), as hereinafter described. In addition, the overall form of the resilient aircraft turbine engine mount is similar to a conventional rigid clevis mount, thereby providing an easy replacement or conversion from a conventional rigid clevis mount.

Figure 4:
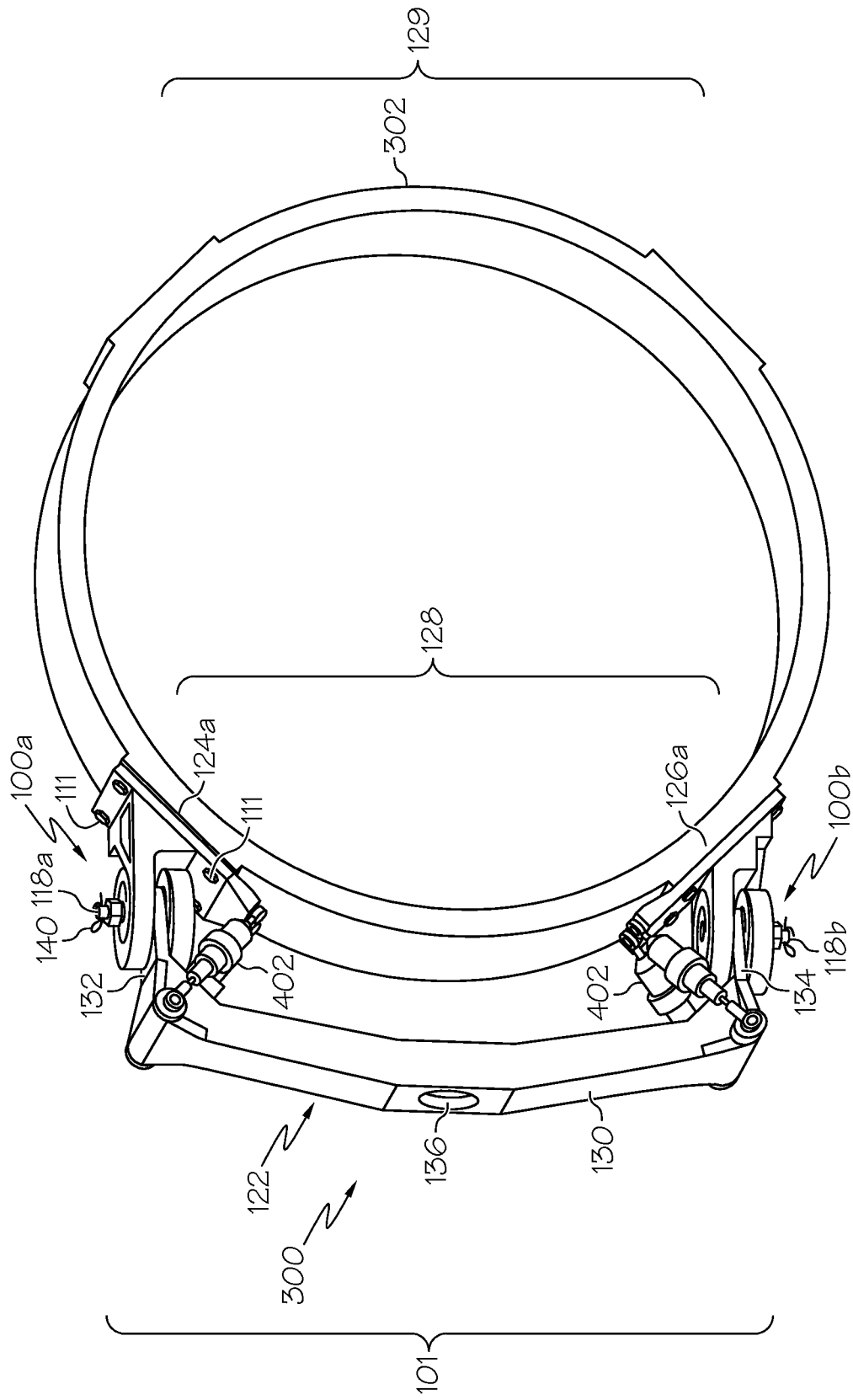
FIG. 4 is a perspective view of an aircraft engine mounting system according to exemplary embodiments, comprising a pair of the resilient aircraft engine mounts of FIGS. 2 and 3 for attaching a representative aircraft engine to a generally C-shaped yoke of a pylon structure of an aircraft (not shown) using a pair of clevis pins, the pair of resilient aircraft engine mounts comprising a first resilient aircraft engine mount and a second resilient aircraft engine mount.

Referring now to FIG. 4, accordance to exemplary embodiments, an aircraft engine mounting system 300 for attaching an aircraft engine (as represented by structure 302) to a pylon structure of an aircraft comprises a pair of the resilient aircraft engine mounts 100 (100a and 100b) and a pair of clevis pins 118. In addition to attaching the aircraft engine to the pylon structure, the resilient aircraft engine mounts 100a and 100b help to isolate aircraft engine-produced vibratory forces transmitted from the engine to the fuselage of an aircraft, according to exemplary embodiments. The pylon structure is designed to also be attached to the aircraft fuselage. The pylon structure is connected intermediate between the aircraft engine and the aircraft fuselage. The pylon structure, fuselage, and aircraft are conventional, and are not part of the present invention. The pylon structure includes a spar and at least one yoke 122. For ease of illustration, FIG. 4 simply shows the representative aircraft engine structure 302 attached to the pylon structure, more specifically the yoke 122 thereof, by the pair of resilient aircraft engine mounts 100.

The pair of resilient aircraft engine mounts 100 comprises a first resilient aircraft engine mount 100a and a second resilient aircraft engine mount 100b. The first and second resilient aircraft engine mounts 100a and 100b act as an interface between the aircraft engine structure 302 and the yoke 122 of the pylon structure. The first resilient aircraft engine mount 100a is attached at a first mount location 124a of the aircraft engine and the second resilient aircraft engine mount is attached at a second mount location 126a on the aircraft engine structure, the second mount location spaced apart from the first mount location. The first and second resilient aircraft engine mounts 100a and 100b are attached at the first and second mount locations 124a and 126a respectively by the attachment members 111 through the one or more apertures 110 in each mounting plate 108 thereof. The first and second mount locations 124a and 126a form a first set 128 of mount locations on the aircraft engine. The first resilient aircraft engine mount 100a and the second resilient aircraft engine mount 100b collectively form a first set 101 of resilient aircraft engine mounts. The aircraft engine structure 302 may include a plurality of sets of mount locations. For example, the representative aircraft engine structure of FIG. 4 includes the first set of mount locations 128 for attaching the first set 101 of resilient aircraft mounts thereto and a second set of mount locations 129 for attaching a second set of resilient aircraft mounts thereat (not shown). In other exemplary embodiments, a greater number of sets of mount locations for attaching a corresponding set of resilient aircraft engine mounts may be included. The second set of resilient aircraft mounts (not shown) would be for a right side engine (not shown). While not shown, the aircraft engine mounting system 300 for attaching an aircraft engine (as represented by structure 302) to the pylon structure of an aircraft may further comprise additional aircraft engine resilient mounts (i.e., more than two) with or without a corresponding yoke.

The yoke 122 of the pylon structure may be configured in any number of configurations. As illustrated in FIG. 4, the yoke is generally C-shaped with a central portion 130 and first and second terminal end mounting portions 132 and 134. Each of the first and second terminal end mounting portions extends at about a 90 degree angle to the central portion. The central portion includes an opening 136 for receiving attachment means for attaching the yoke 122 to the spar (not shown) of the pylon structure. Each of the first and second terminal end mounting portions of the yoke 122 has a mount opening 138 formed therethough. The first resilient aircraft engine mount 100a attaches to the first terminal end mounting portion 132 of the yoke. The first terminal end mounting portion 132 of the yoke is disposed between the first and second spiral springs 104a and 104b of the first resilient aircraft engine mount 100a and secured therein by a first clevis pin 118a of the pair of clevis pins 118a and 118b, as hereinafter described. FIGS. 5 through 8 illustrate in more detail the first resilient aircraft engine mount 100a of FIG. 4, with the first terminal end mounting portion 132 of the generally C-shaped yoke 122 disposed between the pair of opposed spiral springs thereof 104 and the first clevis pin 118a extending through the first center opening 114, the mount opening 138, and the second center opening 116, and secured by a hitch pin 140 and a locking nut 142.

Figure 7:
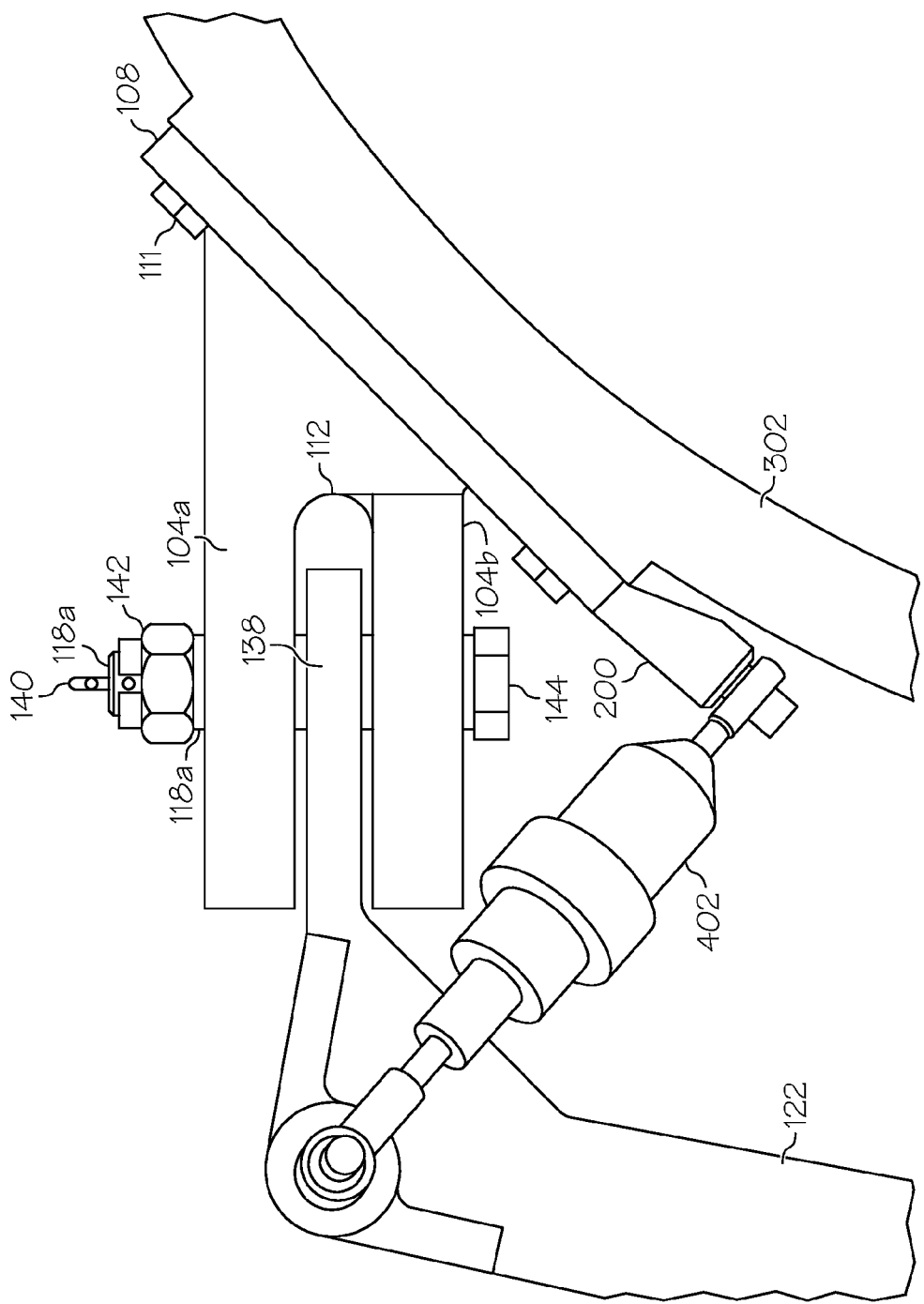
FIG. 7 is an enlarged perspective side view of the first resilient aircraft engine mount of FIGS. 4-6, illustrating the first mounting portion of the generally C-shaped yoke disposed between the pair of opposed spiral springs and the clevis pin extending through the first center opening, the mount opening, and the second center opening and secured by the hitch pin and the locking nut.
Figure 8:
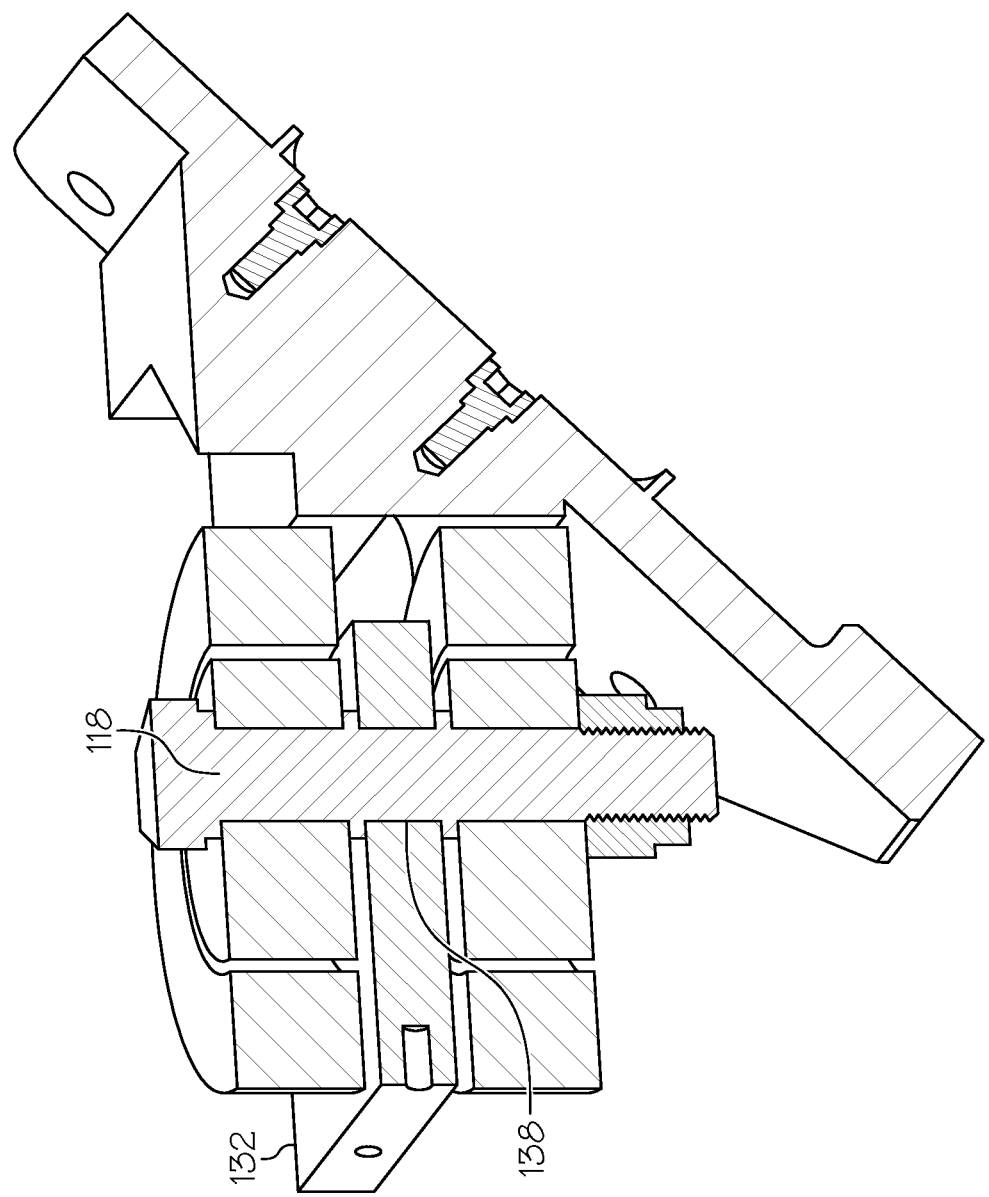
FIG. 8 is a sectional view of the first resilient aircraft engine mount of FIG. 7.

Referring again to FIG. 4, the second resilient aircraft engine mount 100b attaches to the second terminal end mounting portion 134 of the yoke 122. The second terminal end mounting portion 134 of the yoke is disposed between the first and second spiral springs 104a and 104b of the second resilient aircraft engine mount 100b and secured therein by a second clevis pin 118b of the pair of clevis pins. Each of the first and second clevis pins 118a and 118b extends through the first opening 114 of the first spiral spring 104a, through the mount opening 138 in the respective terminal end mounting portion 132 or 134 of the yoke 122, and through the second opening 116 of the second spiral spring 104b of the respective resilient aircraft mount. The first and second clevis pins 118a and 118b may be a partially threaded or unthreaded bolt or the like as illustrated and may be made of a high strength material with a cross-opening (not shown) for the hitch pin 140 as known in the art. Hex head 144 of the clevis pin/bolt 118a is shown in FIG. 7. The hitch pin 140, also known as a cotter pin, comprises a metal fastener with tines that are bent during installation. The hitch pin may be made, for example, of wire with a half-circular cross section. Hitch pins come in multiple sizes and types. The first and second clevis pins 118a and 118b are also held in place by the locking nut 142. The locking nut 142 is internally threaded for threadable engagement on the first and second clevis pins. The clevis pin is used in combination with the hitch pin 140 and locking nut 142 to secure the resilient aircraft engine mount to the yoke 122, such that as the end of yoke 122 moves, both the first and second spiral springs of each resilient aircraft engine mount are forced to move together with the end of the yoke 122.

Dampers such as vibration isolation struts may also be required to provide damping at certain frequencies, as known to one skilled in the art. In an embodiment, at least one damper 402 is releasably coupled to the first and second resilient engine mounts 100a and 100b and to the yoke 122. The at least one damper 402 is attached near each terminal end mounting portion 132 and 134 of the yoke 122 through the resilient aircraft engine mounts 100a and 100b. As illustrated in FIGS. 4 through 7, each of the dampers has a first axial end portion and a second axial end portion. The first axial end portion of a pair of dampers is attached on opposite sides of the yoke and the second axial end portion of the pair of dampers is releasably coupled to the extension 200 on the base (i.e., the mounting plate 108) of the respective resilient aircraft engine mount. While FIGS. 4 through 8 illustrate at least one damper, it is to be understood that dampers may not be necessary as known to one skilled in the art. If dampers are not to be used, the resilient aircraft engine mounts of FIGS. 1-3 may be used (i.e., resilient aircraft engine mounts without the extension 200). It is also to be understood that dampers may be coupled to other than the resilient aircraft engine mounts.

From the foregoing, it is to be appreciated that the resilient aircraft engine mount can effectively be used to provide vibration isolation and provide compliance without substantial cross-axis reaction forces. The resilient aircraft engine mount is compact and lightweight, is easily stiffness tunable over a greater range than a conventional clevis mount, in three translational axes, and provides an easy replacement or conversion from a rigid clevis mount in an engine mounting system. The resilient aircraft engine mounts are capable of handling high static and dynamic loads while providing a high degree of reliability and predictability. All six degrees of motion of the aircraft engine, that is the three translations and the three rotations, can depend upon the resilient aircraft engine mounts according to exemplary embodiments.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A resilient aircraft engine mount comprising:
    a base; and
    a pair of opposed spiral springs in parallel forming a clevis with the base, a first spiral spring of the pair of opposed spiral springs having a first center opening extending therethrough and a second spiral spring of the pair of opposed spiral springs having a second center opening extending therethrough that is concentric with the first center opening for accepting a clevis pin.

2. The resilient aircraft engine mount of claim 1, wherein the base and the pair of opposed spiral springs are integrally formed as a single structure.

3. The resilient aircraft engine mount of claim 1, wherein the first and second spiral springs are each comprised of a beam having a generally rectangular cross section, the beam of the first spiral spring having a selected length, a selected height, and a selected width that is substantially the same as the selected length, the selected height, and the selected width of the second spiral spring.

4. The resilient aircraft engine mount of claim 3, wherein the selected length, the selected height, and the selected width of the beams of the first and second spiral springs are adjusted to permit the tuning of the resilient aircraft engine mount in three translational axes providing a desired stiffness in three degrees of freedom.

5. The resilient aircraft engine mount of claim 1, wherein the base is configured for attachment to a mount location on an aircraft engine.

6. An aircraft engine mounting system comprising:
    a pair of resilient aircraft engine mounts, each resilient aircraft engine mount comprising:
        a base for attaching to a mount location on an aircraft engine;
        a pair of opposed spiral springs in parallel forming a clevis with the base, a first spiral spring of the pair of opposed spiral springs having a first center opening extending therethrough and a second spiral spring of the pair of opposed spiral springs having a second center opening extending therethrough that is concentric with the first center opening for accepting a clevis pin, each resilient aircraft engine mount independently tunable in three translational axes; and
    a pair of clevis pins, the clevis pin comprising one clevis pin of the pair of clevis pins.

7. The aircraft engine mounting system of claim 6, wherein the base and the pair of opposed spiral springs of each resilient aircraft engine mount are integrally formed as a single structure.

8. The aircraft engine mounting system of claim 6, wherein the first and second spiral springs of each resilient aircraft engine mount are each comprised of a beam having a generally rectangular cross section.

9. The aircraft engine mounting system of claim 8, wherein the beam of the first spiral spring has a selected length, a selected height, and a selected width that is substantially the same as a selected length, a selected height, and a selected width of the beam of the second spiral spring for permitting the tuning of each resilient aircraft engine mount in the three translational axes providing a desired stiffness in three degrees of freedom.

10. The aircraft engine mounting system of claim 9, wherein the pair of resilient aircraft engine mounts provides six degrees of freedom vibration isolation.

11. The aircraft engine mounting system of claim 6, wherein the pair of resilient aircraft engine mounts comprises a first resilient aircraft engine mount and a second resilient aircraft engine mount, the base of the first resilient aircraft engine mount attached to the mount location comprising a first mount location and the base of the second resilient aircraft engine mount attached to the mount location comprising a second mount location that is spaced apart from the first mount location.

12. The aircraft engine mounting system of claim 11, wherein the first and second mount locations comprise a set of mount locations on the aircraft engine.

13. The aircraft engine mounting system of claim 12, wherein the aircraft engine includes a plurality of sets of mount locations on the aircraft engine.

14. The aircraft engine mounting system of claim 11, wherein the aircraft engine is attached to a pylon structure intermediate the aircraft engine and a fuselage of an aircraft, the pylon structure comprising at least one yoke having first and second mounting portions with a mount opening extending through each of the first and second mounting portions, wherein the first mounting portion of the yoke is disposed between the first and second spiral springs of the first resilient aircraft engine mount and the second mounting portion of the yoke is disposed between the first and second spiral springs of the second resilient aircraft engine mount, each of the first and second mounting portions secured by the clevis pin extending through the first center opening, the second center opening, and the mount opening, the clevis pin secured by a hitch pin and a locking nut.

15. An aircraft engine mounting system for isolating aircraft engine-produced vibratory forces from a fuselage of an aircraft and for attaching an aircraft engine to a pylon structure comprising a yoke having a first mounting portion and a second mounting portion, each of the first and second mounting portions having a mount opening therethrough, the aircraft engine mounting system comprising:
 a first resilient aircraft engine mount attached to a first mount location of the aircraft engine and a second resilient aircraft engine mount attached to a second mount location of the aircraft engine, each of the first and second resilient aircraft engine mounts comprising:
  a base for attaching to the respective mount location of the aircraft engine;
  a pair of opposed spiral springs in parallel forming a clevis, a first spiral spring of the pair of opposed spiral springs having a first opening extending therethrough, a second spiral spring of the pair of opposed spiral springs having a second opening extending therethrough that is concentric with the first opening for accepting a clevis pin, each resilient aircraft engine mount independently tunable in three translational axes; and
 wherein the first mounting portion of the yoke is disposed between the first and second spiral springs of the first resilient aircraft engine mount with a first clevis pin extending and secured through the first opening, the mount opening, and the second opening and the second mounting portion is disposed between the first and second spiral springs of the second resilient aircraft engine mount with a second clevis pin extending and secured through the first opening, the second opening, and the mount opening.

16. The aircraft engine mounting system of claim 15, wherein the first and second spiral springs of the first and second resilient aircraft engine mounts are each comprised of a beam having a generally rectangular cross-section.

17. The aircraft engine mounting system of claim 16, wherein the beam of the first spiral spring has a selected length, a selected height, and a selected width that is substantially the same as a selected length, a selected height, and a selected width of the beam of the second spiral spring for permitting the independent tuning of each the first and second resilient aircraft engine mounts in the three translational axes providing a desired stiffness in each resilient aircraft engine mount in three degrees of freedom.

18. The aircraft engine mounting system of claim 17, wherein the first and second resilient aircraft engine mounts together provide six degrees of freedom vibration isolation.

19. The aircraft engine mounting system of claim 18, wherein the base and the pair of opposed spiral springs are integrally formed as a single machined or cast structure.

20. The aircraft engine mounting system of claim 15, wherein the base further comprises an extension and the aircraft engine mounting system further comprises a plurality of dampers, each damper of the plurality of dampers having a first axial end portion and a second axial end portion, the first axial end portion coupled to the extension of the base and the second axial end portion coupled to the yoke.

* * * * *